June 17, 1930.　　A. Q. ESTEVEZ　　1,764,159
SUGAR CANE PLANTER
Filed March 12, 1928　　6 Sheets-Sheet 3
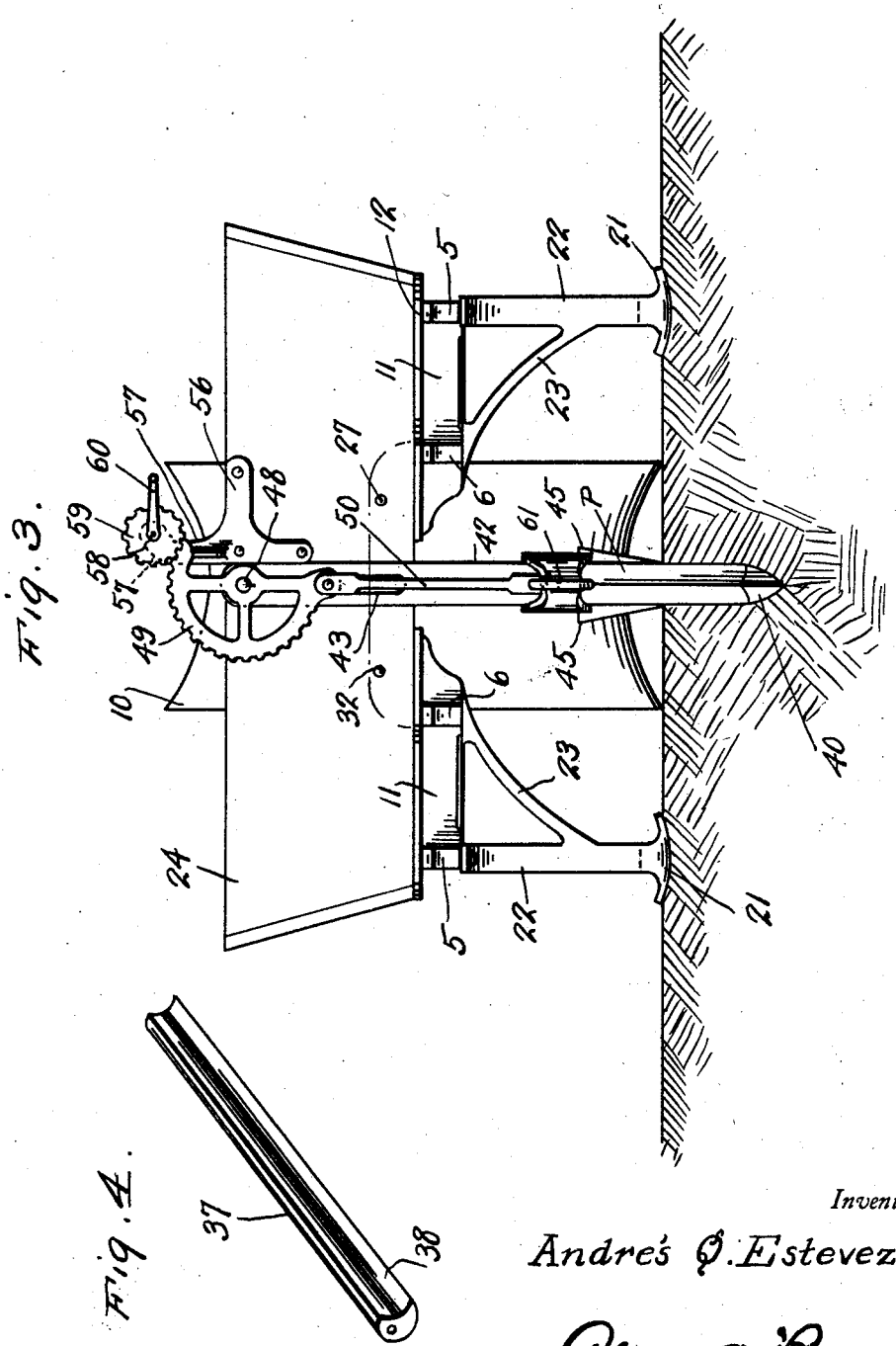
Inventor
Andrés Q. Estevez
By Clarence A. O'Brien
Attorney

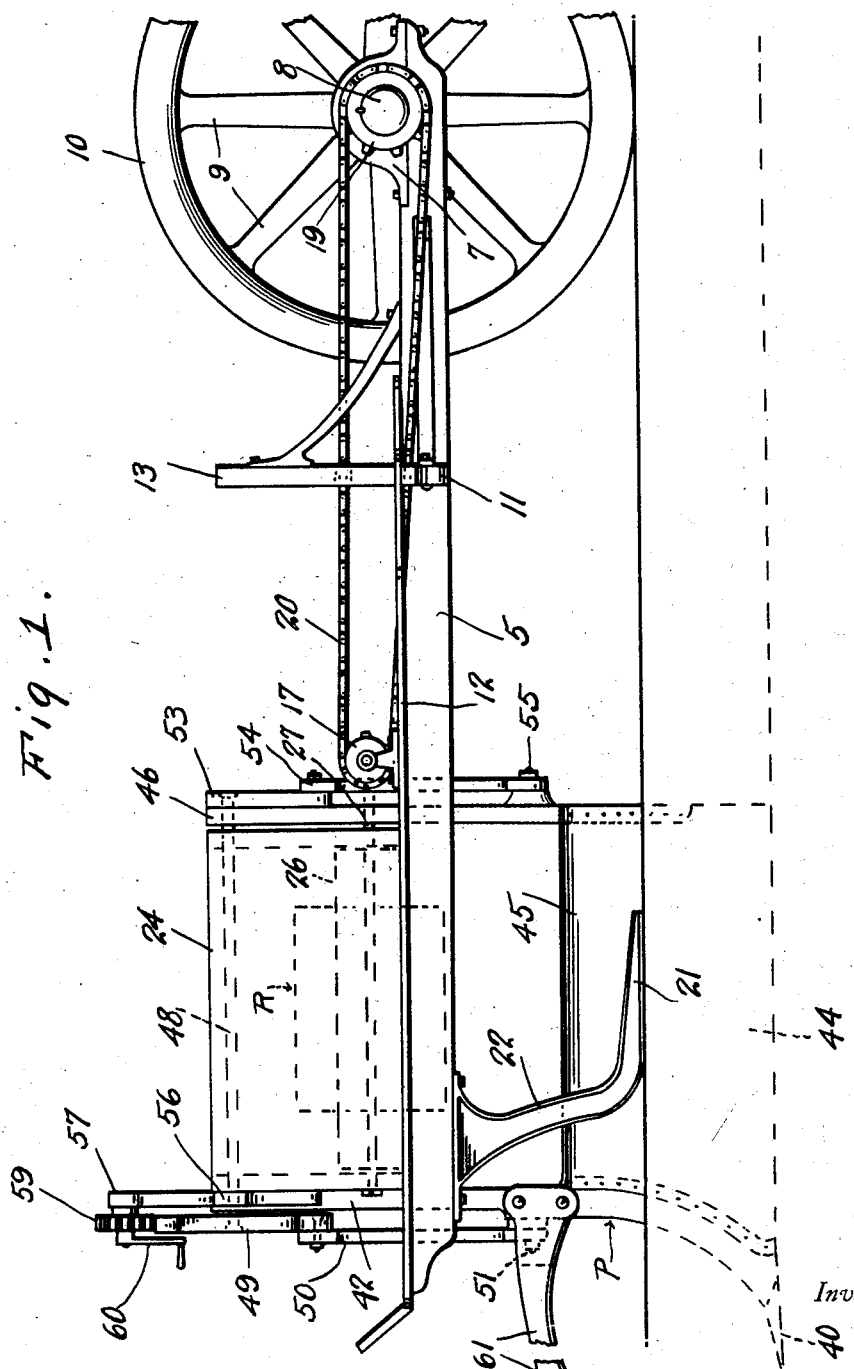

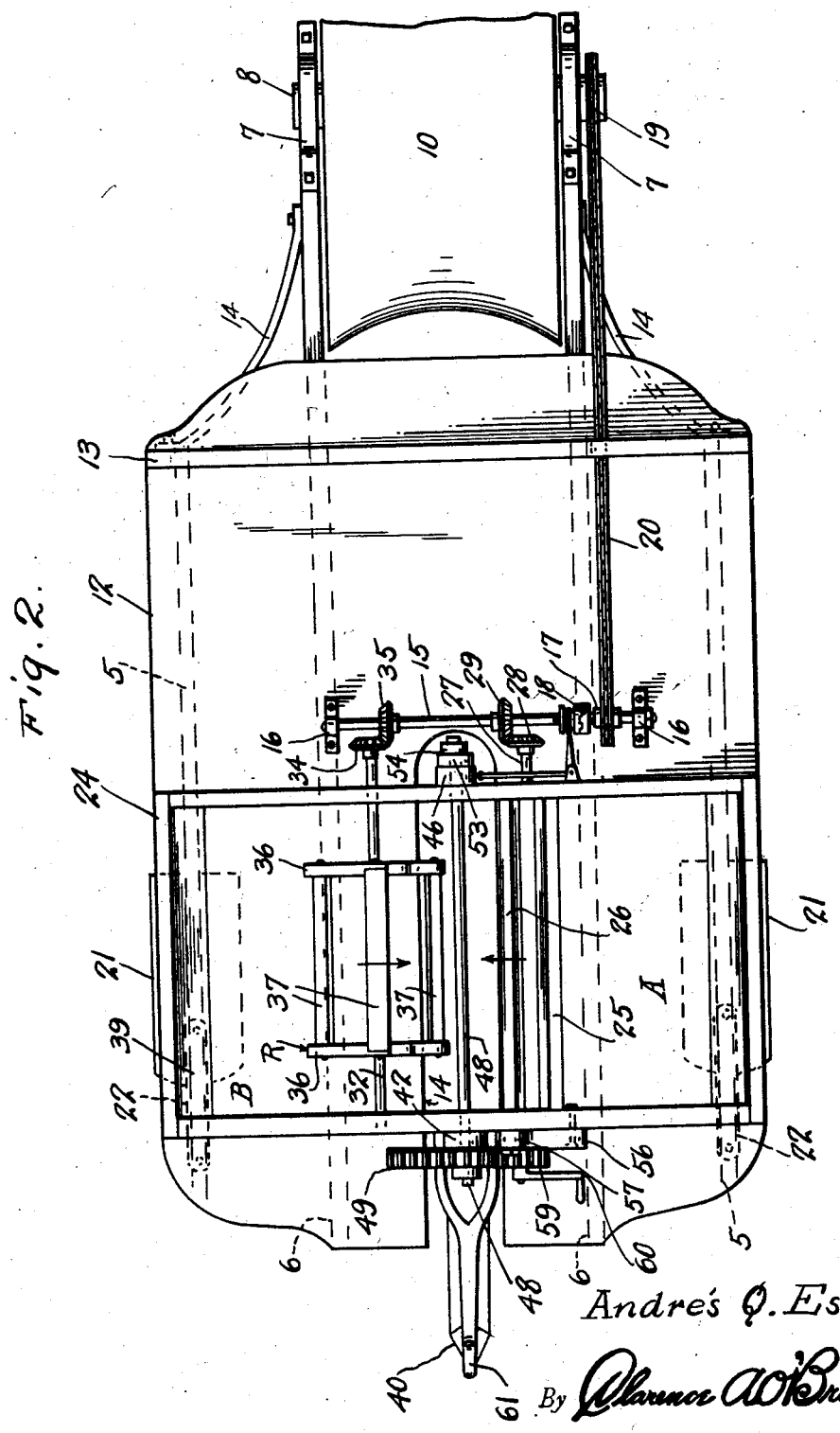

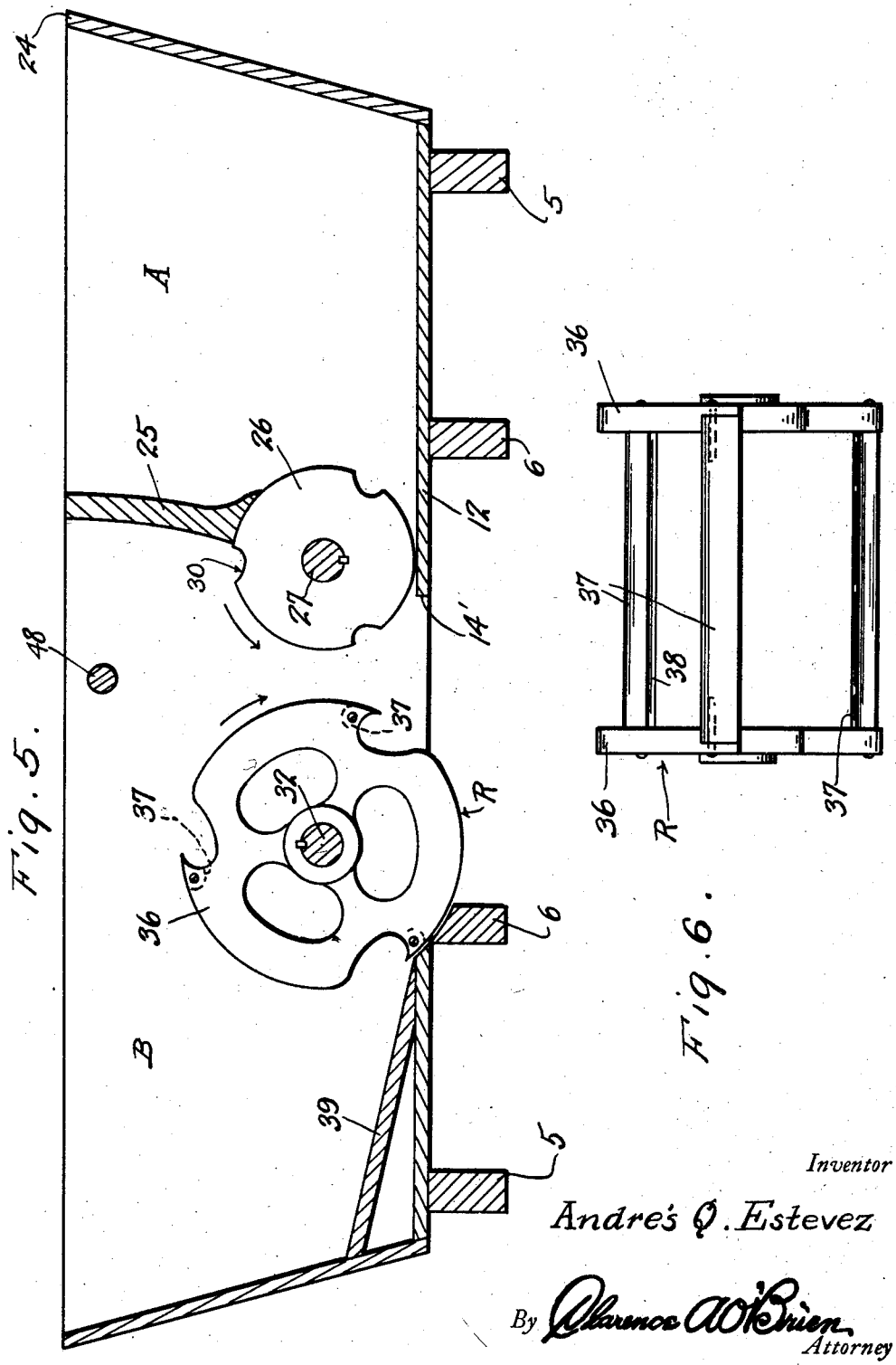

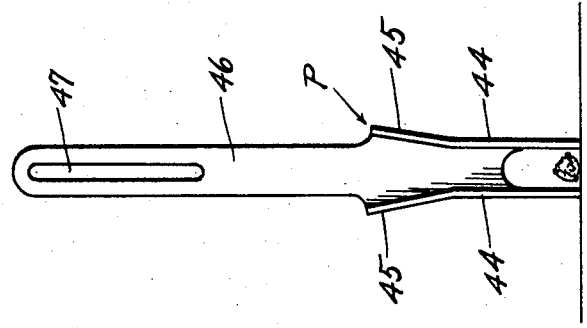
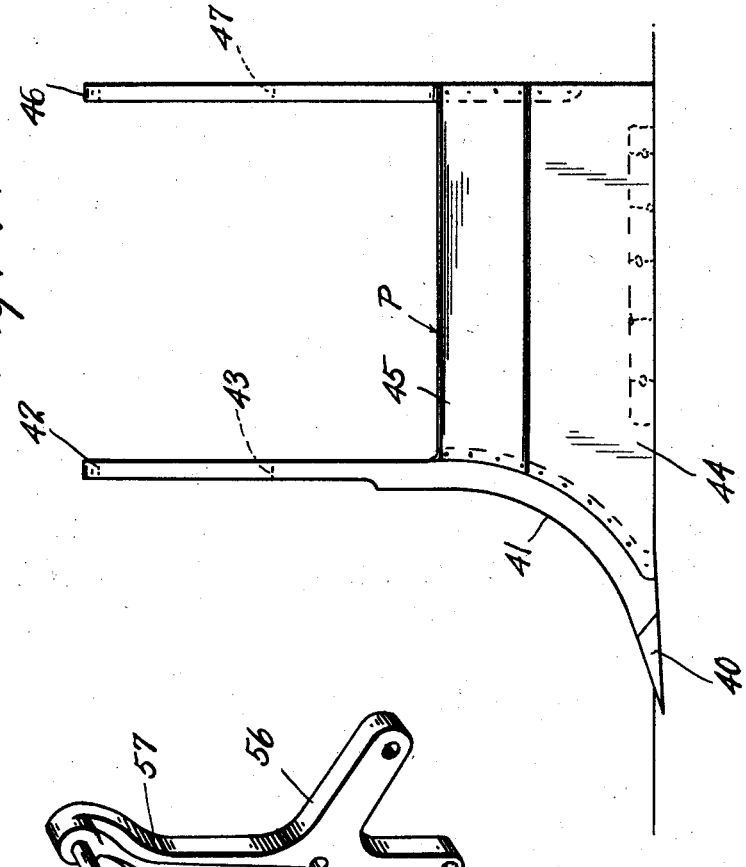
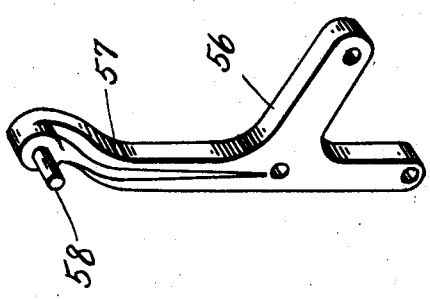

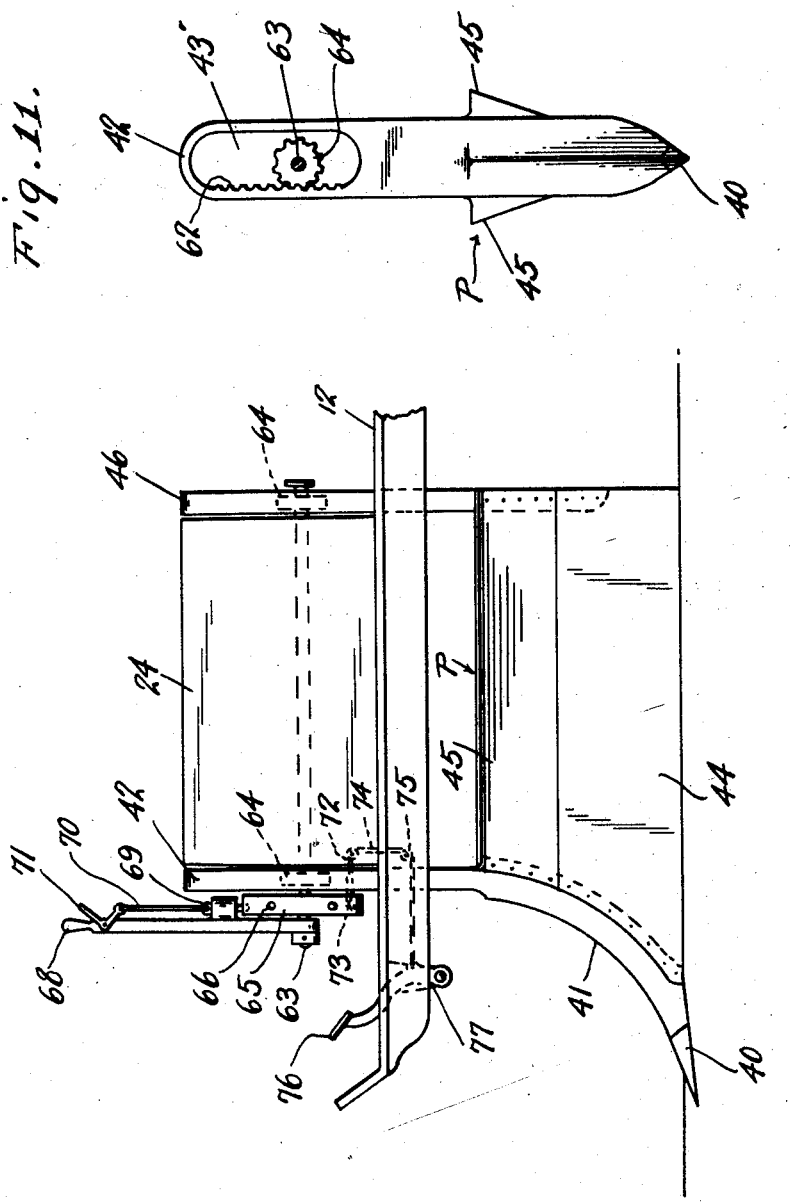

Patented June 17, 1930

1,764,159

UNITED STATES PATENT OFFICE

ANDRÉS QUINTERO ESTEVEZ, OF FRANKLIN, MASSACHUSETTS

SUGAR-CANE PLANTER

Application filed March 12, 1928. Serial No. 260,960.

The present invention relates to a planter for sugar cane and has for its prime object to provide a planter which will dig a furrow and deposit therein at regular intervals a cane stalk with a proper amount of fertilizer.

Another very important object of the invention resides in the provision of a plow which is adjustable to dig at the desired depth in the soil and which is provided with a boot structure for guiding the cane from a hopper to the furrow made by the plow.

Another very important feature of the invention resides in the provision of a hopper having a partition extending longitudinally thereof, to divide the hopper into a cane compartment and a fertilizer compartment, and means for individually delivering from the hopper the cane stalks, and simultaneously delivering a pre-determined amount of fertilizer.

A further very important object of the invention resides in the provision of a planter of this nature, containing in a compact and convenient arrangement on a mobile frame, elements for digging a furrow and depositing cane and fertilizer therein and covering the furrow as the mobile frame is moved along the ground.

A still further very important object of the invention resides in the provision of a sugar cane planter of this nature, which is comparatively simple in its construction, thoroughly efficient and reliable in its operation, easy to manipulate, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawings:

Figure 1 is a side elevation of the planter embodying the features of my invention.

Figure 2 is a top plan view thereof.

Figure 3 is a front elevation thereof.

Figure 4 is a perspective view of one of the cane receiving members of the delivery mechanism.

Figure 5 is a transverse vertical section taken through the hopper.

Figure 6 is an elevation of the cane delivering reel.

Figure 7 is a detail side elevation of the plow unit.

Figure 8 is a rear end elevation of the plow unit.

Figure 9 is a perspective view of a bracket used in conjunction with the adjusting mechanism of the plow unit.

Figure 10 is a fragmentary side elevation showing particularly the forward portion of another embodiment of the planter, and Figure 11 is a front end elevation of the plow unit thereof showing an adjusting shaft in section.

Referring to the drawing in detail, it will be seen that numerals 5 denote a pair of longitudinal frame bars, and numerals 6 another pair of longitudinal frame bars spaced inwardly from the frame bars 5 and spaced from each other. The frame bars extend a considerable distance to the rear of the rear ends of the bars 5 and have journaled on the rear ends by means of bearing brackets 7, an axle shaft 8, on the center of which is fixed a wheel 9, having an annular rim 10, which is dished out, on its periphery, as is clearly shown in Figure 3. Cross bars 11 are disposed between the rear ends of the bars 5 and intermediate portions of the bars 6. A platform 12 is mounted on the longitudinal frame bars 5 and 6, terminating a slight distance forwardly of the wheel 9. A transverse vertical wall 13 rises from the rear portion of the platform 12 and is braced as at 14, in respect to the longitudinal bar 6. In the forward portion of the platform there is formed a longitudinally extending slot 14', starting from the forward edge of the platform and terminating a little rearwardly of the center thereof. A shaft 15 is journaled in brackets 16, on the platform 12, to extend transversely thereof, immediately to the rear of the rear end of the slot 14'. A sprocket 17 is loose on the shaft 15 and has a clutch unit 18 associated there-with and operable in any convenient manner. A sprocket 19 is mounted on the axle shaft 8 at one edge and a chain 20 is sprained over the sprocket 19 and the sprocket 17 and obviously by placing the clutch 18 in an engaged position the shaft 15 may be rotated, as the planter moves. A pair of runners 21 merge at their forward ends in rising shanks 22, the upper ends of which are attached to forward portions of the longitudinal frame bars 5, and these shanks are further braced as at 23, to the frame bars 6.

A hopper 24 of oblong construction is disposed transversely across the forward portion of the platform 12 and has for its bottom a portion of the platform 12. This hopper is formed with a partition 25 disposed longitudinally and terminating a distance above the platform 12 to one side of the slot 14. A cylindrical drum 26 keyed on the shaft 27 rotates in the space between the platform 12 and the lower edge of the partition 25. This shaft 27 is journaled in the front and rear walls of the hopper and extends through the rear wall and has on its rear end a bevelled gear 28, meshing with a bevelled gear 29 on the shaft 15. The drum 26 is provided with longitudinally extending peripheral pockets 30, and the partition 25 divides the hopper into a fertilizer compartment A and a cane compartment B. As the drum 26 rotates, in the direction indicated by the arrow in Figure 5, it will be seen that the pockets 30 will fill with fertilizer from the compartment and dump the fertilizer through the slot 14. A reel R is mounted on a shaft 32, journaled in the front and rear walls of the hopper 24, and extending through the rear wall and having on its rear end a bevelled pinion 34 meshing with the bevelled pinion 35, on the shaft 15, so that the shaft 32 will revolve in an opposite direction from the shaft 27 when the shaft 15 is revolving. The reel R comprises disc like sides 36 keyed on the shaft 32 in spaced relation to each other and in spaced relation to the front and rear walls of the hopper. These sides 36 are formed with peripheral notches 37, and cane receiving members 38 are disposed between the sides and have faces 38 dished out and curved concentrically with portions of the notches 37, so that when the reel rotates and picks up stalks of cane in the notches, these members 37 will brace the stalks and prevent the breaking thereof. The reel rotates in the direction of the arrow shown in Figure 5, and it will be seen that as a supply of fertilizer is being dumped through the slot 14, the cane stalk will also be dropped thereto. It also will be noted that when the cane stalk is being dropped so as to extend longitudinally of the planter, in order to feed the cane toward the reel, a bottom 39 is formed in the compartment B of the hopper 24 and slanted downwardly toward the reel.

The letter P denotes generally a plow unit, the plow proper thereof including a digging point 40, with a share like extension curved outwardly and rearwardly therefrom, as indicated at 41, and terminating in a bar 42 disposed vertically and slotted longitudinally as at 43. A pair of boot forming walls 44, are attached at their forward ends to the extension 41 and extend rearwardly therefrom in spaced relation to each other. The upper portions of these walls as indicated at 45, incline upwardly and outwardly from each other to form a flared entrance to the boots. A bar 46 extends downwardly between portions 45, and a distance between the walls 44 but terminates above the lower edges thereof. The bar 46 is slotted longitudinally as at 47, in registry with the slot 43 of the bar 32, these bars 42 and 46 being disposed in spaced parallelism. A shaft 48 is journaled through the front and rear walls of the hopper 24 and extends through the slots 43 and 47, it being noted that the bars 42 and 46 extend up alongside the outer surfaces of the front and rear walls of the hopper. A gear segment 49 is fixed to the front end of the shaft 48, and a link 50 is connected thereto and to the plow unit at its extension 41, as is indicated at 51, in Figure 1. On the rear end of the shaft 48 there is fixed a crank arm 53 which has connected with its extremity a link 54, pivotally engaged as at 55, with the bar 46, of the plow unit P. A bracket 56 is attached to the front wall of the hopper and has an arm 57 rising therefrom above the upper edge of the front wall, the terminal of the arm being provided with a pintle 58 on which is rotatable a gear 59 operable by a crank 60. The gear 59 meshes with the gear segment 49. It will thus be seen that by turning the gear 59 to its crank 60 the segment 49 and the shaft 48 may be rocked, and the links 50 will pull upwardly on the plow unit, lifting the same, so that the point 40 may dig into the ground at the desired depth or may be raised to such a position as not to engage the ground. The plow unit is guided in its vertical adjustment by the slotted bars 42 and 46, cooperating with the shaft 48 which extends through slots 43 and 47.

The planter may be pulled along by any suitable draft means and in the present instance I have disclosed a tongue 61 which is bifurcated at its rear end and attached to the sides of the bar 42 at its juncture with the extension 41. This feature, however, is not of the essence of the invention.

In Figures 10 and 11, I have disclosed another embodiment of the plow unit adjusting mechanism wherein the slot 43' corresponding to slot 43, in the front bar 42 is provided on one longitudinal edge with rack teeth 62. The rear bar 46 is similarly formed. A shaft 63 has pinions 64 thereon, meshing with the rack teeth 62. This shaft 63 is journaled through the front and rear walls of the hopper, and obviously when turned, will cause the raising and lowering of the plow unit. In order to rock the shaft 63, I mount on the forward portion thereof a disc 65, which is provided with a series of circumferentially spaced peripheral indentures 66. A lever 68 is rockable on the forward end of the shaft 63 and has a detent or pin 69 for engaging the indentures 66, said detent or pin being releasable through a link 70 and a hand lever 71 rockable on the lever 68. A spring pressed pin 72, engages indentures 73, on one face of the disc 65, for holding it in different adjusted positions, and the pin 72 may be released by a cable 74, trained over pulleys 75, and actuatable by a foot lever 76, rockable on a bracket 77.

From the above detailed description, it will be seen that when the planter is moving along and the plow unit has been adjusted to the desired depth either by the mechanism disclosed in Figures 1, 2, and 3, or that disclosed in Figures 10 and 11, when the clutch 18 is thrown in, the shaft 15 will rotate simultaneously, to cause the rotation of the cane feeding reel and the fertilizer feeding drum, so that as the plow unit digs the furrow the cane and fertilizer will be intermittently fed to drop into the boot portion of the plow unit, to be deposited in the furrow and subsequently covered by the wheel 9 and its dished out rim 10. Of course, when the machine is moved along and it is desired that the same not operate, the plow unit will be adjusted sufficiently high to clear the ground and the clutch 18 will be thrown out.

It is thought that the construction, operation, and advantages of this invention will now be quite apparent to those skilled in this art, without a more detailed description thereof. It will be apparent that changes in the details of construction and in the combination and arrangement of parts may be resorted to, without departing from the spirit or scope of the invention as hereinafter claimed or sacrificing any of its advantages.

Having thus described my invention, what I claim as new is:

1. In a sugar cane planter, and in combination, a mobile frame, a hopper supported on the frame and provided in its bottom with an opening, a partition in the hopper to provide therein a cane compartment and a fertilizer compartment, means for feeding individual stalks of cane through the opening, means for feeding a quantity of fertilizer simultaneously with each stalk of cane, a plow supported by the frame below the hopper, a pair of vertical walls mounted on the plow to extend rearwardly from the plow in spaced relation to each other, so that the space between the walls is below the opening.

2. In a sugar cane planter, a hopper having its bottom formed with a slot extending longitudinally of the planter, a partition in the hopper extending longitudinally of the planter and terminating a distance above the bottom of the hopper to one side of the slot, a drum rotatably mounted in the hopper below the partition to one side of the opening, and a cane delivering reel rotatable in the hopper in the other side of the slot.

3. In a sugar cane planter, a hopper having its bottom formed with a slot extending longitudinally of the planter, a partition in the hopper extending longitudinally of the planter, and terminating a distance above the bottom of the hopper to one side of the slot, a drum rotatably mounted in the hopper below the partition to one side of the opening, a cane delivering reel rotatable in the hopper in the other side of the slot, said reel comprising a pair of disc like sides having peripheral notches, and members extending between the sides and having dished out spaces concentrically disposed with the notches.

4. In a sugar cane planter, a plow unit comprising a digging point with an extension rising upwardly therefrom and terminating in a bar, a pair of plates fixed to the extension and disposed rearwardly in spaced relation to each other, a bar extending downwardly between the plates at their rear edges and terminating a distance above their bottom edges.

5. In a sugar cane planter, a plow unit comprising a digging point with an extension rising upwardly therefrom and terminating in a bar, a pair of plates fixed to the extension and disposed rearwardly in spaced relation to each other, a bar extending downwardly between the plates at their rear edges and terminating a distance above their bottom edges, a hopper, a frame for supporting the hopper, said bars rising alongside of the front and rear walls of the hopper, a shaft journaled in the hopper, a crank on one end of the shaft, a gear segment on the other end of the shaft, links connecting the segments and the crank with the plow unit, and a gear for operating the gear segment to raise and lower the plow unit.

6. In a sugar cane planter, a plow unit comprising a digging point with an extension rising upwardly therefrom and terminating in a bar, a pair of plates fixed to the extension and disposed rearwardly in spaced relation to each other, a bar extending downwardly between the plates at their rear edges and terminating a distance above their bottom edges, a hopper, a frame for supporting the hopper, said bars rising alongside of the front and rear walls of the hopper, a shaft journaled in the hopper, a crank on one end of the shaft, a gear segment on the other end of the shaft, links connecting the segments and the crank with the plow unit, and a gear for operating the gear segment to raise and lower the plow unit, a wheel journaled at the rear of the frame, runners mounted at the front of the frame, said wheel having a dished rim.

7. In a sugar cane planter, a plow unit comprising a digging point with an extension rising upwardly therefrom and terminating in a bar, a pair of plates fixed to the extension and disposed rearwardly in spaced relation to each other, a bar extending downwardly between the plates at their rear edges and terminating a distance above their bottom edges, a hopper, a frame for supporting the hopper, said bars rising alongside of the front and rear walls of the hopper, a shaft journaled in the hopper, a crank on one end of the shaft, a gear segment on the other end of the shaft, links connecting the segments and the crank with the plow unit, and a gear for operating the gear segment to raise and lower the plow unit, means for simultaneously feeding individual stalks of cane and a quantity of fertilizer from the hopper to the space between the plates, said means being operatively connected with said wheel.

In testimony whereof I affix my signature.

ANDRÉS QUINTERO ESTEVEZ.